(12) United States Patent
Jeong et al.

(10) Patent No.: US 11,966,256 B2
(45) Date of Patent: Apr. 23, 2024

(54) DISPLAY APPARATUS AND METHOD FOR MANUFACTURING THE SAME

(71) Applicant: Samsung Display Co., Ltd., Yongin-si (KR)

(72) Inventors: Gyeongho Jeong, Yongin-si (KR); Sungsang Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 446 days.

(21) Appl. No.: 16/830,580

(22) Filed: Mar. 26, 2020

(65) Prior Publication Data
US 2020/0225707 A1 Jul. 16, 2020

Related U.S. Application Data

(62) Division of application No. 15/377,607, filed on Dec. 13, 2016, now Pat. No. 10,642,312.

(30) Foreign Application Priority Data

Jan. 11, 2016 (KR) .................... 10-2016-0003332

(51) Int. Cl.
*G06F 1/16* (2006.01)
*B32B 3/28* (2006.01)
(Continued)

(52) U.S. Cl.
CPC .............. *G06F 1/1652* (2013.01); *B32B 3/28* (2013.01); *B32B 7/00* (2013.01); *B32B 7/022* (2019.01);
(Continued)

(58) Field of Classification Search
CPC .... G06F 1/1641; G06F 1/1616; G06F 1/1652; G06F 1/1637; B32B 7/12; B32B 2457/20; B32B 7/00
See application file for complete search history.

(56) References Cited

U.S. PATENT DOCUMENTS 7,190,503 B2 3/2007 Ide
8,859,304 B2 10/2014 Momma et al.
(Continued)

FOREIGN PATENT DOCUMENTS

CN 1612185 A 5/2005
CN 103178083 A 6/2013
(Continued)

OTHER PUBLICATIONS

EPO Extended Search Report dated Jul. 12, 2017, for corresponding European Patent Application No. 17151047.2 (9 pages).

*Primary Examiner* — Alicia J Weydemeyer
(74) *Attorney, Agent, or Firm* — Lewis Roca Rothgerber Christie LLP

(57) ABSTRACT

A display apparatus includes: a flexible first layer including a bending area; an adhesive layer on an upper surface of the flexible first layer; and a second layer attached to the flexible first layer by the adhesive layer. A direction of internal stress at a first portion of the flexible first layer is different from a direction of internal stress at a second portion of the flexible first layer, when the flexible first layer is in a flat state.

10 Claims, 5 Drawing Sheets
(1 of 5 Drawing Sheet(s) Filed in Color)

(51) Int. Cl.
- *B32B 7/00* (2019.01)
- *B32B 7/022* (2019.01)
- *B32B 7/023* (2019.01)
- *B32B 7/03* (2019.01)
- *B32B 7/12* (2006.01)
- *B32B 37/00* (2006.01)
- *B32B 37/12* (2006.01)
- *B32B 38/18* (2006.01)
- *G02F 1/13* (2006.01)
- *G02F 1/1333* (2006.01)
- *B32B 38/00* (2006.01)
- *G06F 3/041* (2006.01)

(52) U.S. Cl.
CPC ............... *B32B 7/023* (2019.01); *B32B 7/03* (2019.01); *B32B 7/12* (2013.01); *B32B 37/0053* (2013.01); *B32B 37/12* (2013.01); *B32B 38/1866* (2013.01); *G02F 1/1303* (2013.01); *G02F 1/1333* (2013.01); *G02F 1/133305* (2013.01); *B32B 38/1875* (2013.01); *B32B 2307/50* (2013.01); *B32B 2457/20* (2013.01); *B32B 2457/208* (2013.01); *G02F 2202/28* (2013.01); *G06F 3/041* (2013.01); *G06F 2203/04103* (2013.01)

(56) References Cited

U.S. PATENT DOCUMENTS

| | | | |
|---|---|---|---|
| 9,616,644 | B2 | 4/2017 | Kim et al. |
| 10,147,902 | B2 | 12/2018 | Sun |
| 2006/0098153 | A1* | 5/2006 | Slikkerveer ....... G02F 1/133305 156/196 |
| 2012/0020056 | A1 | 1/2012 | Yamagata et al. |
| 2012/0132811 | A1 | 5/2012 | Fuchs et al. |
| 2013/0180653 | A1 | 7/2013 | Kim et al. |
| 2013/0284351 | A1 | 10/2013 | Natarajan et al. |
| 2014/0045283 | A1 | 2/2014 | Hirakata et al. |
| 2014/0138009 | A1 | 5/2014 | Lim et al. |
| 2014/0295150 | A1* | 10/2014 | Bower .................... B32B 25/20 428/411.1 |
| 2014/0299269 | A1 | 10/2014 | Son et al. |
| 2014/0327630 | A1 | 11/2014 | Burr et al. |
| 2014/0345791 | A1 | 11/2014 | Son et al. |
| 2014/0377508 | A1 | 12/2014 | Oh et al. |
| 2015/0147532 | A1 | 5/2015 | Nam et al. |
| 2015/0200375 | A1* | 7/2015 | Kim ...................... H10K 77/111 257/40 |
| 2015/0357387 | A1* | 12/2015 | Lee ........................ G06F 1/1652 257/40 |
| 2016/0338219 | A1* | 11/2016 | Seo .................... G02F 1/133308 |

FOREIGN PATENT DOCUMENTS

| | | |
|---|---|---|
| CN | 103824519 A | 5/2014 |
| CN | 104600208 A | 5/2015 |
| JP | 2002-341323 | 11/2002 |
| JP | 2009-133931 | 6/2009 |
| KR | 10-2012-0029090 | 3/2012 |
| KR | 10-2014-0080238 | 6/2014 |
| KR | 10-2014-0120568 | 10/2014 |
| KR | 10-2014-0139361 | 12/2014 |
| KR | 10-2015-0025509 | 3/2015 |
| KR | 10-2015-0053084 | 5/2015 |
| KR | 10-2015-0108481 | 9/2015 |
| WO | 2015/148779 A1 | 10/2015 |

* cited by examiner

DISPLAY APPARATUS AND METHOD FOR MANUFACTURING THE SAME

CROSS-REFERENCE TO RELATED APPLICATIONS

This application is a divisional of U.S. patent application Ser. No. 15/377,607, filed on Dec. 13, 2016, which claims priority to, and the benefit of, Korean Patent Application No. 10-2016-0003332, filed on Jan. 11, 2016, in the Korean Intellectual Property Office (KIPO), the disclosures of both of which are incorporated herein in their entirety by reference.

BACKGROUND

1. Field

One or more aspects of example embodiments relate to a display apparatus for preventing defects during a bending process, and a method of manufacturing the same.

2. Description of the Related Art

Generally, a display apparatus includes a stack structure including various elements, for example, a touch screen panel, a polarizer, and/or a window, in addition to a display panel. Regarding the stack structure including the various elements, after the various elements are stacked in the stack structure during a manufacturing process thereof, the stack structure is handled as an integrated body, and during usage after the manufacturing process, the stack structure is used as the integrated body. Generally, because the display apparatus has proper hardness, there would be no problems handling the stack structure as an integrated body during the manufacturing process, and using the stack structure as the integrated body during usage after the manufacturing process.

However, in a case when the display apparatus is a flexible display apparatus, a stack structure may be bent during and after a manufacturing process thereof because the display apparatus is flexible. Thus, there may be problems with delamination occurring in the stack structure.

The above information disclosed in this Background section is for enhancement of understanding of the background of the present disclosure, and therefore, it may contain information that does not constitute prior art.

SUMMARY

One or more aspects of example embodiments are directed to a display apparatus for preventing defects during a manufacturing process, and a method of manufacturing the same.

Additional aspects and features will be set forth in part in the description which follows, and in part, will be apparent from the description, or may be learned by practice of the presented embodiments.

According to an example embodiment of the inventive concept, a display apparatus includes: a flexible first layer including a bending area; an adhesive layer on an upper surface of the flexible first layer; and a second layer attached to the flexible first layer by the adhesive layer. A direction of internal stress at a first portion of the flexible first layer is different from a direction of internal stress at a second portion of the flexible first layer when the flexible first layer is in a flat state.

In an embodiment, the first portion and the second portion may be at respective non-bending areas of the first layer.

In an embodiment, the first portion may be at one side of the bending area, and the second portion may be at another side of the bending area.

In an embodiment, a direction of internal stress at a third portion of the second layer may be different from a direction of internal stress at a fourth portion of the second layer when the first layer is in the flat state.

In an embodiment, the third portion and the fourth portion may correspond to respective non-bending areas of the second layer.

In an embodiment, the third portion may be at one side of the bending area, and the fourth portion may be at another side of the bending area.

In an embodiment, the first portion may be at one side of the bending area, the second portion may be at another side of the bending area, the third portion may correspond to the first portion, and the fourth portion may correspond to the second portion.

In an embodiment, the direction of the internal stress at the first portion may be different from the direction of the internal stress at the third portion, and the direction of internal stress at the second portion may be different from the direction of the internal stress at the fourth portion.

In an embodiment, the first layer may include a display panel, and the second layer may include a functional layer.

In an embodiment, the functional layer may include at least one of a touch screen panel, a polarizer, and a window.

According to an example embodiment of the inventive concept, a method of manufacturing a display apparatus, includes: preparing an adhesive layer having a first protection film on a first surface thereof, and having a second protection film on a second surface thereof; removing the first protection film from the adhesive layer; and placing the first surface of the adhesive layer in contact with an upper surface of a flexible first layer while in a bent state by using a roller to press and move along the second protection film; removing the second protection film; and placing a second layer, which is either in a non-bent state or in a bent state that is different from the bent state of the flexible first layer, on the adhesive layer while the flexible first layer is in the bent state so that the second layer corresponds to the bent state of the flexible first layer.

In an embodiment, the placing of the first surface of the adhesive layer in contact with the upper surface of the flexible first layer may include using a jig comprising a curved upper surface to place the flexible first layer in the bent state.

In an embodiment, the placing of the first surface of the adhesive layer in contact with the upper surface of the flexible first layer may include using the jig to maintain the bent state of the flexible first layer without deformation, the jig being rigid.

In an embodiment, the placing of the first surface of the adhesive layer in contact with the upper surface of the flexible first layer may include: placing an elastic layer between the second protection film and the roller; and moving the roller on the elastic layer to press and move along the adhesive layer.

In an embodiment, the placing of the first surface of the adhesive layer in contact with the upper surface of the flexible first layer may include moving the roller from a first non-bending area of the flexible first layer through a bending area of the flexible first layer to a second non-bending area of the flexible first layer.

In an embodiment, the flexible first layer may include a flexible display panel including a bending area, and the second layer may include a functional layer.

In an embodiment, the functional layer may include at least one of a touch screen panel, a polarizer, and a window.

According to an example embodiment of the inventive concept, a method of manufacturing a display apparatus, includes: preparing a flexible first layer and a flexible second layer; placing a roller on one surface of the flexible second layer to press the one surface of the flexible second layer; and moving the roller along the flexible second layer, while the flexible first layer is bent in a bent state, so that another surface of the flexible second layer contacts an upper surface of the flexible first layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects and features will become apparent and more readily appreciated from the following description of the example embodiments, taken in conjunction with the accompanying drawings, in which.

DETAILED DESCRIPTION

Figure 1:
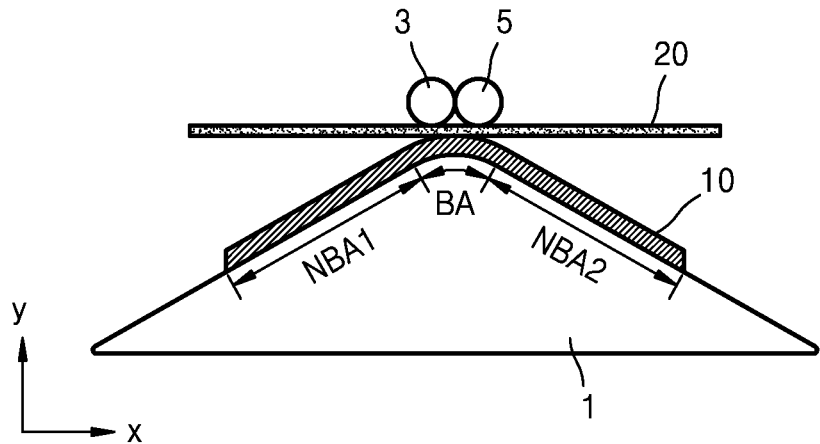
FIGS. 1 through 3 are cross-sectional views schematically illustrating processes of a method of manufacturing a display apparatus according to an embodiment.

Hereinafter, example embodiments will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present. Further, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
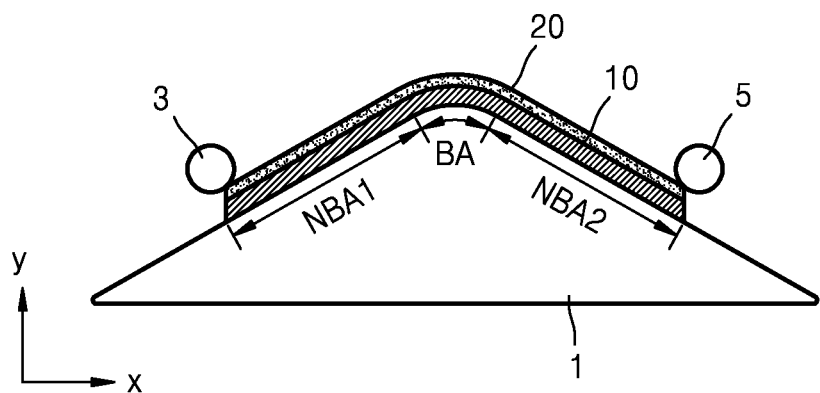
Figure 3:
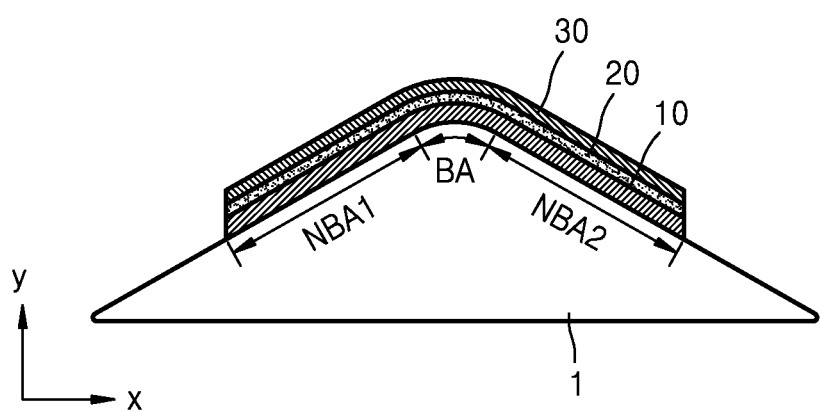

FIGS. 1 through 3 are cross-sectional views schematically illustrating processes of a method of manufacturing a display apparatus according to an embodiment. According to a method of manufacturing the display apparatus, a flexible display panel 10 (hereinafter, display panel 10) having a bending area BA is prepared. The display panel 10 may include an organic light-emitting device or a liquid crystal device as a display element, or may be variously modified.

When the display panel 10 is in a bent state at the bending area BA, an adhesive layer 20 is placed on an upper surface of the display panel 10 in a +y direction (e.g., above the display panel 10). A jig 1 having a curve on an upper surface thereof in the +y direction may be used to bend the display panel 10, as illustrated in FIG. 1. In a state where the display panel 10 is disposed over the jig 1, the display panel 10 may be flexed along the upper surface of the jig 1 to be bent. If the display panel 10 remains unbent when being disposed over the jig 1, the display panel 10 may be pressed by a roller, so that the display panel 10 is bent along the upper surface of the jig 1. If desired, a clamp may be used to fasten the display panel 10, so that the display panel 10 is maintained in, or substantially maintained in, the bent state over the jig 1.

FIG. 1 illustrates that the display panel 10 includes a bending axis, which extends in a z-axis direction perpendicular to an x-axis direction and a y-axis direction in the bending area BA, and the display panel 10 is bent about the bending axis. The display panel 10 may include non-bending areas NBA1 and NBA2 at respective sides of the bending area BA. The jig 1 is rigid, and thus, when a first surface of the adhesive layer 20 is disposed to contact an upper surface of the display panel 10, the jig 1 may maintain or may substantially maintain the display panel 10 in the bent state without deformation thereof, so that the first surface of the adhesive layer 20 contacts the upper surface of the display panel 10.

Before the adhesive layer 20 is located over the display panel 10, the adhesive layer 20 may be in a state where a first protection film and a second protection film may be respectively attached to the first surface and a second surface of the adhesive layer 20. By removing the first protection film from the adhesive layer 20 in the above state, the first surface of the adhesive layer 20 may contact the upper surface of the display panel 10. The first surface of the adhesive layer 20 may contact the upper surface of the display panel 10 and rollers 3 and 5 may move while pressing the second protection film of the adhesive layer 20 in a state where the adhesive layer 20 is located over the display panel 10, as illustrated in FIG. 1. FIG. 2 illustrates that most portions of the first surface of the adhesive layer 20 are attached to the upper surface of the display panel 10 by the rollers 3 and 5 moving while pressing the second protection film of the adhesive layer 20 in a state where the rollers 3 and 5 are placed on the second protection film that is located over the second surface of the adhesive layer 20. That is, the roller 3 moves in a −x direction and a −y direction, and the roller 5 moves in a +x direction and the −y direction, so that most portions of the first surface of the adhesive layer 20 are attached to the upper surface of the display panel 10. Accordingly, the first surface of the adhesive layer 20 is in surface-contact with the upper surface of the display panel 10. The first surface of the adhesive layer 20 may cover an entire upper surface of the display panel 10.

As such, the adhesive layer 20 may include a pressure sensitive adhesive (PSA). That is, the first surface of the adhesive layer 20 may be attached to the upper surface of the display panel 10 by using the pressure applied by the rollers 3 and 5. The adhesive layer 20 including the PSA has characteristics of ductility, and thus, the adhesive layer 20 may stretch or contract when the display panel 10 is bent or flattened. This will be described in more detail later.

Thereafter, the second protection film, which is on the adhesive layer 20, is removed from the adhesive layer 20. In a state where the display panel 10 is bent, a functional layer 30, which may be either in a non-bent state or in a bent state that is different from that of the display panel 10, is attached to the display panel 10 (e.g., via the adhesive layer 20) to correspond to the bent state of the display panel 10 by using the adhesive layer 20, as illustrated in FIG. 3. The phrase, "the functional layer 30 may be either in the non-bent state or in a bent state that is different from that of the display panel 10" may be referred to as "the functional layer 30 may have a shape that is different from a bent shape of the display panel 10."

For example, in a state where the functional layer 30 is initially parallel to an x-z plane, the functional layer 30 may be bent and attached to the display panel 10 to correspond to the bent state of the display panel 10 by using rollers (e.g., rollers 3 and 5). That is, when the functional layer 30 is attached to the display panel 10 by using the adhesive layer 20, a method that is similar to, or substantially the same as, the method of attaching the adhesive layer 20 to the display panel 10, as illustrated in FIG. 2, may be used to attach the functional layer 30 to the display panel 10. For example, the rollers 3 and 5, which are located above an upper surface of the functional layer 30, may be moved while pressing the functional layer 30, so that a lower surface of the functional layer 30 may be attached to the second surface of the adhesive layer 20. The functional layer 30 is bent and attached to the display panel 10 to correspond to the shape of the display panel 10 by using the rollers 3 and 5, even if the bent state of the functional layer is different from the bent state of the display panel 10, although the functional layer 30 is in the bent state. This is similarly applied to embodiments and modifications thereof, which will be described in more detail later.

The functional layer 30 may be at least one of various layers. For example, the functional layer 30 may be a touch screen panel, a polarizer, and/or a transparent window.

Figure 4:
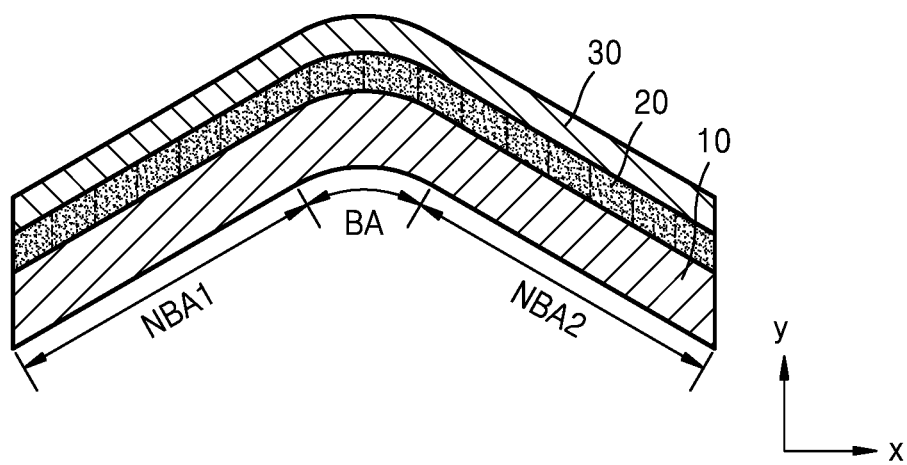
FIGS. 4 through 6 are cross-sectional views schematically illustrating a display apparatus according to an embodiment.
Figure 5:
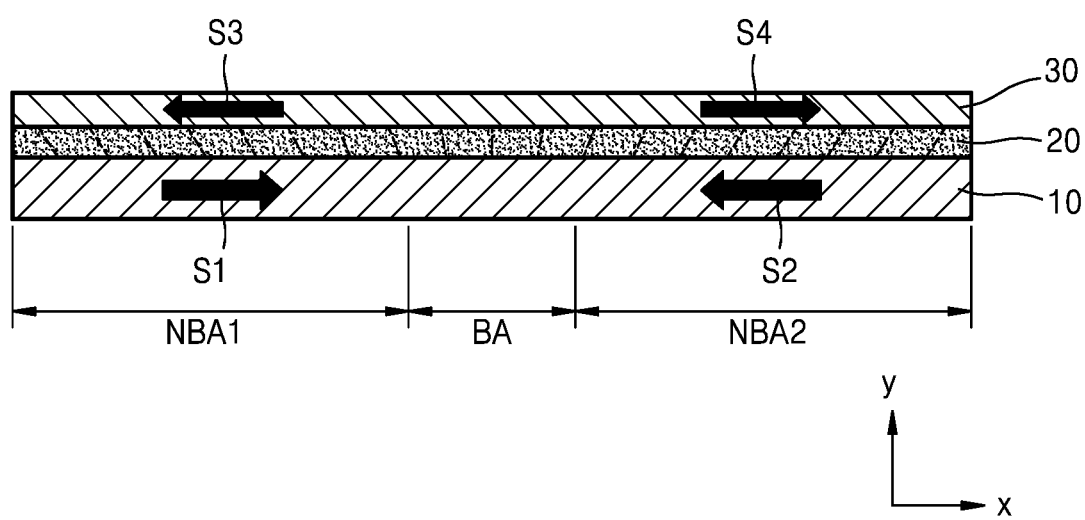
Figure 6:
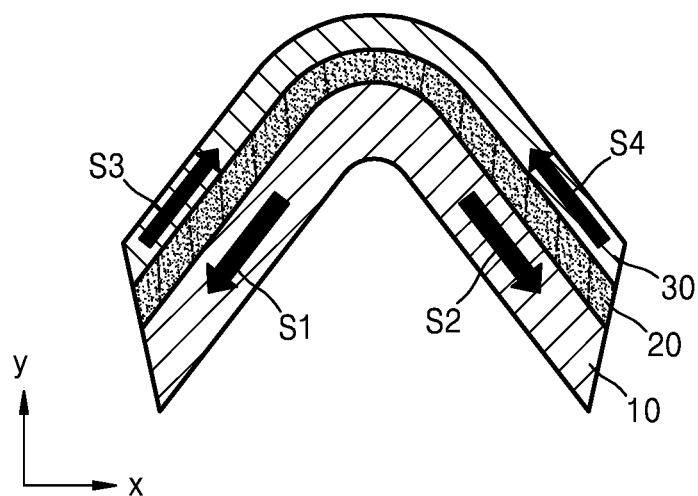

FIGS. 4 through 6 are cross-sectional views schematically illustrating a display apparatus according to an embodiment.

FIG. 4 illustrates the bent state of the display panel 10 having the same or substantially the same shape as that of the upper surface of the jig 1 illustrated in FIGS. 1 through 3. As illustrated in FIG. 4, dashed/dotted lines (e.g., broken lines) in the adhesive layer 20 extend in the y-axis direction, and represent that the adhesive layer 20 is neither stretched nor contracted, but in a state of equilibrium. When the display panel 10 is spread and flattened, as illustrated in FIG. 5, portions of the display panel 10, the adhesive layer 20, and the functional layer 30 may contract, and other portions of the display panel 10, the adhesive layer 20, and the functional layer 30 may stretch. In more detail, the functional layer 30 as an uppermost layer contracts, and the display panel 10 as a lowermost layer stretches. Accordingly, internal stresses S1, S2, S3, and S4 may be generated in the display panel 10 and the functional layer 30, directions of the internal stresses S1, S2, S3, and S4 being illustrated in FIG. 5.

In more detail, when the display panel 10 stretches, the first non-bending area NBA1 at a first portion of the display panel 10 includes first internal stress S1 applied in the +x direction, which is opposite to a stretching direction of the first portion. The second non-bending area NBA2 at a second portion of the display panel 10, which is opposite to the first non-bending area NBA1 with respect to the bending area BA, includes second internal stress S2 applied in the −x direction, which is opposite to a stretching direction of the second portion. In a state where the display panel 10 is spread and flattened, as illustrated in FIG. 5, a direction of the first internal stress S1 in the first non-bending area NBA1 at the first portion becomes different from a direction of the second internal stress S2 in the second non-bending area NBA2 at the second portion.

When the functional layer 30 contracts, the first non-bending area NBA1 at a third portion of the functional layer 30 includes third internal stress S3 applied in the −x direction, which is opposite to a contracting direction of the third portion. The second non-bending area NBA2 at a fourth portion of the functional layer 30, which is opposite to the first non-bending area NBA1 with respect to the bending area BA, includes fourth internal stress S4 applied in the +x direction, which is opposite to a contracting direction of the fourth portion. In a state where the functional layer 30 is spread and flattened, a direction of the third internal stress S3 in the first non-bending area NBA1 at the third portion of the functional layer 30 becomes different from a direction of the fourth internal stress S4 in the second non-bending area NBA2 at the fourth portion of the functional layer 30.

As such, the direction of the first internal stress S1 in the first non-bending area NBA1 at the first portion of the display panel 10 becomes different from the direction of the third internal stress S3 in the first non-bending area NBA1 at the third portion of the functional layer 30. Similarly, the direction of the second internal stress S2 in the second non-bending area NBA2 at the second portion of the display panel 10 becomes different from the direction of the fourth internal stress S4 in the second non-bending area NBA2 at the fourth portion of the functional layer 30. As a result, the broken lines in the adhesive layer 20 are not all parallel to the y-axis direction, but instead some of the broken lines in the adhesive layer 20 may be slanted with respect to the y-axis direction.

A slanted degree of the respective broken lines in the adhesive layer 20 of FIG. 5 may represent an amount of a shearing stress generated in the adhesive layer 20 when the display panel 10 of FIGS. 3 and 4, which is in the bent state to have the shape corresponding to the shape of the upper surface of the jig 1, is deformed to be in the shape of the display panel 10 of FIG. 5, which is spread in a flat state. In other words, when the broken lines in the adhesive layer 20 are each parallel to the y-axis direction, as illustrated in FIG. 4, the amount of the shearing stress of the adhesive layer 20 may be equal to or substantially equal to zero.

As such, shearing stress may be generated in the adhesive layer 20 when the display panel 10 of FIGS. 3 and 4, which is in the bent state to have the shape corresponding to the shape of the upper surface of the jig 1, is deformed to the display panel 10 of FIG. 5, which is spread in the flat state. However, delamination may not occur from among the display panel 10, the adhesive layer 20, and/or the functional layer 30, due to the excellent ductility of the adhesive layer 20 having the PSA, even if the shearing stress is generated in the adhesive layer 20.

Referring to FIG. 6, the display panel 10 of FIG. 4, which is in the bent state to have the shape corresponding to the shape of the upper surface of the jig 1, is further bent in a direction toward the display panel 10 as shown in FIG. 6. In this case, portions of the display panel 10, the adhesive layer 20, and the functional layer 30 may contract, and other portions of the display panel 10, the adhesive layer 20, and the functional layer 30 may stretch. However, in this case, when compared to the flat state illustrated in FIG. 5, the functional layer 30 being an uppermost layer stretches, and the display panel 10 being a lowermost layer contracts. Accordingly, internal stresses S1, S2, S3, and S4 are generated in the display panel 10 and the functional layer 30, and directions of the internal stresses S1, S2, S3, and S4 are illustrated in FIG. 6.

In more detail, when the display panel 10 contracts, the first non-bending area NBA1 at the first portion of the display panel 10 includes the first internal stress S1 applied in the −x direction and the −y direction, which are opposite to a contracting direction of the first portion. The second non-bending area NBA2 at the second portion of the display panel 10, which is opposite to the first non-bending area NBA1 with respect to the bending area BA, includes the second internal stress S2 applied in the +x direction and the −y direction, which are opposite to a contraction direction of the second portion.

When the functional layer 30 stretches, the first non-bending area NBA1 at the third portion of the functional layer 30 includes the third internal stress S3 applied in the +x direction and the +y direction, which are opposite to a stretching direction of the third portion. The second non-bending area NBA2 at the fourth portion of the functional layer 30, which is opposite to the first non-bending area NBA1 with respect to the bending area BA, includes the fourth internal stress S4 applied in the −x direction and the +y direction, which are opposite to the stretching direction of the fourth portion.

As such, the direction of the first internal stress S1 in the first non-bending area NBA1 at the first portion of the display panel 10 becomes different from the direction of the third internal stress S3 in the first non-bending area NBA1 at the third portion of the functional layer 30. Similarly, the direction of the second internal stress S2 in the second non-bending area NBA2 at the second portion of the display panel 10 becomes different from the direction of the fourth internal stress S4 in the second non-bending area NBA2 at the fourth portion of the functional layer 30. As a result, the broken lines in the adhesive layer 20 are not all parallel to the y-axis direction, and some of the broken lines in the adhesive layer 20 may be slanted with respect to the y-axis direction.

A slanted degree of the respective broken lines in the adhesive layer 20 of FIG. 6 may represent an amount of a shearing stress generating in the adhesive layer 20 when the display panel 10 of FIGS. 3 and 4, which is in the bent state to have the shape corresponding to the shape of the upper surface of the jig 1, is deformed to be in the shape of the display panel 10 of FIG. 6, which is in a further bent state.

As such, shearing stress may be generated in the adhesive layer 20 when the display panel 10 of FIGS. 3 and 4, which is in the bent state to have the shape corresponding to the shape of the upper surface of the jig 1, is deformed to the shape of the display panel 10 of FIG. 6, which is in the further bent state. However, delamination may not occur from among the display panel 10, the adhesive layer 20, and/or the functional layer 30, due to the excellent ductility of the adhesive layer 20 having the PSA, even when the shearing stress is generated in the adhesive layer 20. For example, the shearing stress of the adhesive layer 20, as illustrated in FIG. 5, may be about the same as the shearing stress of the adhesive layer 20, as illustrated in FIG. 6.

Figure 7:
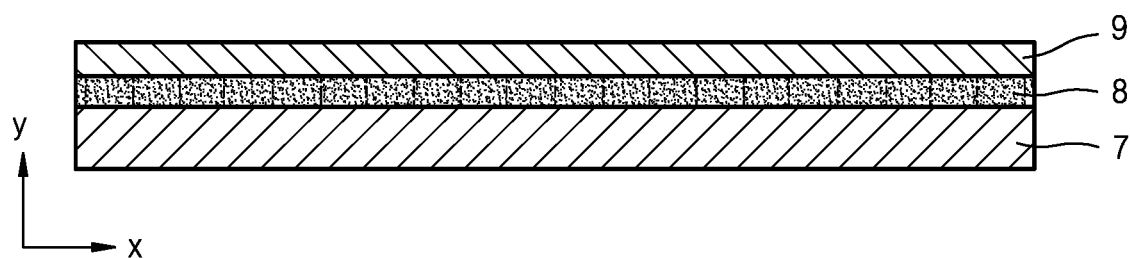
FIGS. 7 and 8 are cross-sectional views schematically illustrating a display apparatus as a comparison example.
Figure 8:
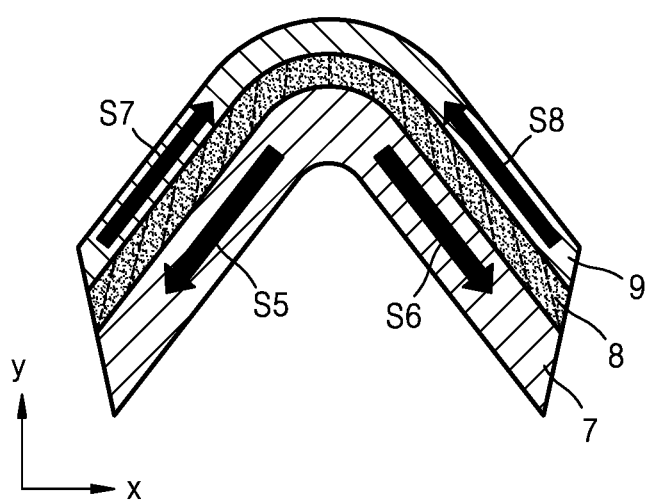

FIGS. 7 and 8 are cross-sectional views schematically illustrating a display apparatus as a comparison example. That is, FIGS. 7 and 8 are the cross-sectional views schematically illustrating a state of a comparison display apparatus that is not manufactured by a method according to the present description. In the comparison display apparatus, in a state where a flexible display panel 7 is in a flat state, an adhesive layer 8 is placed on the flexible display panel 7. Also in the state where the flexible display panel 7 is in the flat state, a functional layer 9 is attached to the flexible display panel 7 by using the adhesive layer 8. Accordingly, as illustrated in FIG. 7, broken lines in the adhesive layer 8 are each parallel to the y-axis direction when the flexible display panel 7 is in the flat state. That is, there is no shearing stress in the adhesive layer 8 when the flexible display panel 7 is in the flat state.

When the display apparatus of the comparison example manufactured by a method of manufacturing the display apparatus of the comparison example is bent (as illustrated in FIG. 8) to be in a state that is the same or substantially the same as the bent state of the display apparatus as illustrated in FIG. 6, portions of the flexible display panel 7, the adhesive layer 8, and the functional layer 9 contract, and other portions of the flexible display panel 7, the adhesive layer 8, and the functional layer 9 stretch. The functional layer 9, being an uppermost layer of the display apparatus of the comparison example, stretches and the flexible display panel 7, being a lowermost layer of the display apparatus of the comparison example, contracts. Accordingly, internal stresses S5, S6, S7, and S8 are generated in the flexible display panel 7 and the functional layer 9, and directions of the internal stresses S5, S6, S7, and S8 are illustrated in FIG. 8.

In more detail, when the flexible display panel 7 contracts, a first portion of the flexible display panel 7 includes internal stress S5 applied in the −x direction and the −y direction, which are opposite to a contracting direction of the first portion, and a second portion of the display panel 7, which is opposite to the first portion with respect to a bending area, includes internal stress S6 applied in the +x direction and the −y direction, which are opposite to a contraction direction of the second portion.

When the functional layer 9 stretches, internal stresses S7 and S8 are generated in the functional layer 9. In more detail, a third portion of the functional layer 9 includes internal stress S7 applied in the +x direction and the +y direction, which are opposite to a stretching direction of the third portion, and a fourth portion of the functional layer 9, which is opposite to the third portion with respect to the bending area, includes internal stress S8 applied in the −x direction and the +y direction, which are opposite to the stretching direction of the fourth portion.

As such, the direction of the internal stress S5 in the first portion of the flexible display panel 7 becomes different from the direction of the internal stress S7 in the third portion of the functional layer 9, and the direction of the internal stress S6 in the second portion of the flexible display panel 7 becomes different from the direction of the internal stress S8 in the fourth portion of the functional layer 9. As a result, the broken lines in the adhesive layer 8 are not all parallel to the y-axis direction, as some of the broken lines in the adhesive layer 8 may be slanted with respect to the y-axis direction, as illustrated in FIG. 8. A slanted degree of the respective broken lines in the adhesive layer 8 of FIG. 8 may represent an amount of a shearing stress generated in the adhesive layer 20 when the flexible display panel 7 of FIG. 7 is deformed from the flat state of FIG. 7 to the bent state of FIG. 8.

As described above, an amount of the bent state of the flexible display panel 7 of FIG. 8 may be the same or substantially the same as an amount of the bending state of the display panel 10 of FIG. 6. However, an amount of the internal stress in the adhesive layer 8 of FIG. 8 is different from an amount of the internal stress in the adhesive layer 20 of FIG. 6. In more detail, the amount of the internal stress in the adhesive layer 8 of FIG. 8 is greater than the amount of the internal stress in the adhesive layer 20 of FIG. 6, because the adhesive layer 8 is initially placed on the flexible display panel 7 in a state where the flexible display panel 7 is in a flat state, and the functional layer 9 is also attached to the flexible display panel 7 by using the adhesive layer 8 when the flexible display panel 7 is in the flat state, according to the method of manufacturing the display apparatus of the comparison example when compared to a manufacturing method according to the present description.

In the display apparatus of the comparison example manufactured according to the method of the comparison example, when the flexible display panel 7 is in the flat state, shearing stress in the adhesive layer 8 is equal to or substantially equal to zero. However, as the flexible display panel 7 is bent, the shearing stress in the adhesive layer 8 may be sharply increased, and thus, delamination may easily occur from among the display panel 7, the adhesive layer 8, and the functional layer 9.

However, in the display apparatus manufactured according to a manufacturing method of the present description, when the display panel 20 is in the flat state, while there may be shearing stress in the adhesive layer 20, the amount of the shearing stress of the adhesive layer 20 is not great. As the display panel 10 is bent similar to the curve of the upper surface of the jig 1, which is used in the manufacturing method of the display panel 10, the shearing stress in the adhesive layer 20 is decreased. When the display panel 10 is further bent, the shearing stress is generated and increased, but the amount of the shearing stress is not as great as that of the comparison display apparatus shown in FIG. 7.

Accordingly, in the display apparatus that is manufactured according to a manufacturing method of the present description, the display panel 10 is deformed from the flat state to the bending state, or vice versa, during usage of the display apparatus, and delamination from among the display panel 10, the adhesive layer 20, and the functional layer 30 may be effectively reduced or prevented. Also, after the display panel 10, the adhesive layer 20, and the functional layer 30 are stacked, the display panel 10 may be deformed to the flat state or the bent state after the manufacturing process or during the manufacturing process. Even during the manufacturing process, delamination from among the display panel 10, the adhesive layer 20, and the functional layer 30 may be effectively reduced or prevented.

Although the display apparatus includes a three-layer structure including the display panel 10, the adhesive layer 20, and the functional layer 30 as described above, the present disclosure is not limited thereto. For example, a multilayer structure including one or more layers may be formed in manufacturing the display apparatus, and an adhesive layer may be interposed between the layers of the multilayer structure. In this case, the display apparatus may be manufactured to prevent or reduce delamination by forming a multi-stack structure in the bent state as described with reference to FIGS. 1 through 3. This is the same or substantially the same as embodiments and modifications thereof, which will be described later.

In some embodiments, a structure of the adhesive layer 20 may be omitted. For example, in a state where the display panel 10 is bent by the jig 1, a roller may be disposed over a surface of the functional layer 30 to press and move along the surface of the functional layer 30, so that the other surface of the functional layer 30 may contact the upper surface of the display panel 10. In this case, an adhesive layer may be pre-prepared on the upper surface of the display panel 10 or on the other surface of the functional layer 30.

Also, the adhesive layer 20 and the functional layer 30 are stacked on the display panel 10 when the display panel 10 is in the bent state, as described above. However, the present disclosure is not limited thereto. For example, in a state where another functional layer, such as a protection film, may be bent by the jig 1, the display panel 10 may be stacked on the other functional layer by an adhesive layer. After this process, in the state that the display panel 10 is in the bent state, the adhesive layer 20 and the functional layer 30 may be stacked on the display panel 10.

That is, a method of manufacturing a display apparatus according to one or more embodiments of the present disclosure includes placing an adhesive layer over a first layer in a state where the first layer is flexible and in a bent state, and thereafter attaching a second layer, which is flexible and in a non-bent state or in a bent state different from the bent state of the first layer, to the first layer to correspond to the bent state of the first layer. Here, the first layer may be one of the display panel 10 and the functional layer 30, which are described above, and the second layer may be the other one of the display panel 10 and the functional layer 30. If the first layer is the functional layer 30 and the second layer is the display panel 10, the above descriptions of the display panel 10 may be applied to the first layer, and the above descriptions of the functional layer 30 may be applied to the second layer. This is applied to embodiments and modifications thereof which will be described later.

As described above, the adhesive layer 20 may be omitted in this case. For example, when the flexible first layer is bent by the jig 1, one or more rollers move while pressing one surface of the flexible second layer so that the other surface of the second layer is attached to an upper surface of the first layer. In this case, an adhesive layer may be pre-formed on the upper surface of the first layer or the other surface of the second layer. Here, the first layer may be one of the above-described display panel 10 and functional layer 30, and the second layer may be the other one of the above-described display panel 10 and functional layer 30.

As illustrated in FIG. 1, when the first surface of the adhesive layer 20 contacts the upper surface of the display panel 10 by using the two rollers 3 and 5, the display panel 10 and the adhesive layer 20 may not be in completely close-contact with each other at a center portion of the bending area BA corresponding to an uppermost portion of the jig 1, because there may be a gap between the two rollers 3 and 5.

Figure 9:
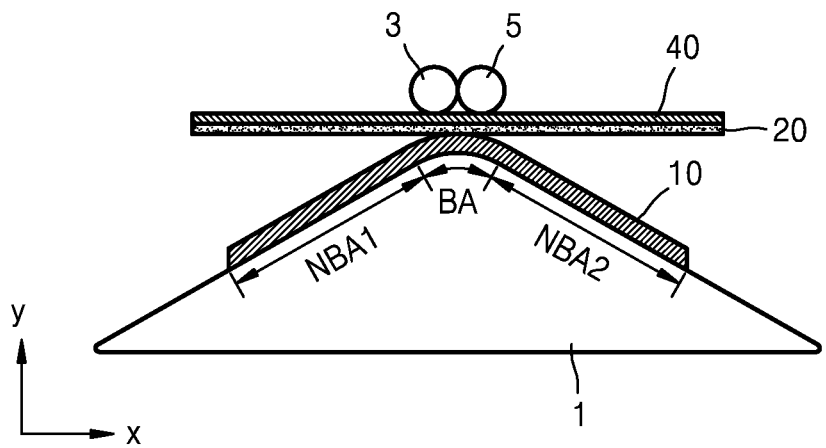
FIG. 9 is a cross-sectional view schematically illustrating a method of manufacturing a display apparatus according to an embodiment.

Accordingly, according to a method of manufacturing a display apparatus according to another embodiment, an elastic layer 40 (e.g., see FIG. 9) may be situated between a second protection film and the two rollers 3 and 5, the second protection film being placed on an upper surface of the adhesive layer 20 in the +y direction, and the two rollers 3 and 5 may move while pressing the elastic layer 40, as illustrated in a cross-sectional view of FIG. 9, so that the display panel 10 and the adhesive layer 20 are in very/completely close-contact with each other even at the center portion of the bending area BA, which corresponds to an uppermost portion of the jig 1. The elastic layer 40 may be a sponge material or a rubber material, for example. The elastic layer 40 may be repeatedly used in manufacturing processes of display apparatuses.

Figure 10:
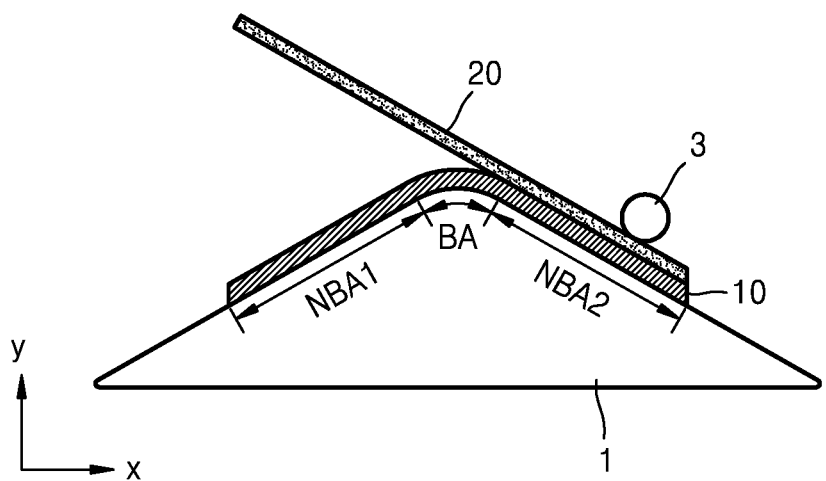
FIG. 10 is a cross-sectional view schematically illustrating a method of manufacturing a display apparatus according to an embodiment.

Also, according to a method of manufacturing a display apparatus according to another embodiment, changing a moving direction of the roller 3 instead of using the elastic layer 40 may be considered, as illustrated in a cross-sectional view of FIG. 10. In more detail, if the roller 3 moves from the second non-bending area NBA 2 of the display panel 10 through the bending area BA to the first non-bending area NBA1, or vice versa/in an opposite manner, the display panel 10 and the adhesive layer 20 may be in suitably/completely close-contact with each other. In this case, an elastic layer may be interposed between the roller 3 and the second protection film, which is disposed on the adhesive layer 20.

Also, a functional layer may be attached to the adhesive layer 20 after the adhesive layer 20 is disposed on the display panel 10, and an elastic layer may be disposed between rollers and an upper surface of the functional layer in the +y direction, so that in this state, the rollers may move while pressing the elastic layer in a similar or same way as the method of FIG. 9, so that a lower surface of the functional layer may maintain close contact with a second surface of the adhesive layer 20. In this case, the elastic layer may be a sponge material or a rubber material, for example. The elastic layer may be repeatedly used in manufacturing processes of display apparatuses.

Also, when a functional layer is attached to the adhesive layer 20 after the adhesive layer 20 is placed on the display panel 10, a roller starts moving from the second non-bending area NBA 2 of the display panel 10 to the first non-bending area NBA1 through the bending area BA, or vice versa, so that the display panel 10 and the adhesive layer 20 may be in completely close-contact with each other. In this case, an elastic layer may be interposed between the roller and a second protection film that is above the adhesive layer 20 (e.g., in the +y direction).

Although methods of manufacturing the display apparatus are described above, the present disclosure is not limited thereto. The display apparatus manufactured according to the above-described methods are also within the scope of the present description.

The display apparatus according to an embodiment may have a shape as illustrated in FIG. 5. That is, the display apparatus according to an embodiment may include the display panel 10 being flexible and having the bending area BA, the adhesive layer 20 on the upper surface of the display panel 10 in the +y direction, and the functional layer 30 attached to the display panel 10 through the adhesive layer 20.

Here, when the display apparatus according to an embodiment, as illustrated in FIG. 5, is spread in a flat state, the direction of the first internal stress S1 in the first non-bending area NBA1 at the first portion of the display panel 10 becomes different from the direction of the second internal stress S2 in the second non-bending area NBA2 at the second portion of the display panel 10, the second non-bending area NBA2 being opposite to the first non-bending area NBA1 with respect to the bending area BA. In the functional layer 30, the direction of the third internal stress S3 in the first non-bending area NBA1 at the third portion of the functional layer 30 becomes different from the direction of the fourth internal stress S4 in the second non-bending area NBA2 at the fourth portion of the functional layer 30. Accordingly, although internal stress is generated in the adhesive layer 20, delamination among the display panel 10, the adhesive layer 20, and the functional layer 30 may be reduced or prevented, because the shear stress is not great.

As described above with reference to FIGS. 4 and 6, in a bending process of the display apparatus, the shear stress in the adhesive layer 20 may be decreased (e.g., see FIG. 4), or the shear stress may not sharply increase even if the shear stress is generated (e.g., see FIG. 6). Accordingly, delamination from among the display panel 10, the adhesive layer 20, and the functional layer 30 may be prevented or reduced (e.g., minimized) in the display apparatus.

Characteristics of the display apparatus according to an embodiment, for example, the amounts and directions of the shear stress in the respective portions of the display panel 10 or the functional layer 30, may be same or substantially the same as described above.

Various methods may be used to confirm existence of the internal stress of each layer of the display apparatus according to an embodiment. For example, when the display apparatus is in the flat state as illustrated in FIG. 5, and when a vicinity of the bending area BA of the functional layer 30 is cut, two cut portions of the functional layer 30 may move away from each other because the direction of the third internal stress S3 in the first non-bending area NBA1 is different from the direction of the fourth internal stress S4 in the second non-bending area NBA2, and because the directions of the third internal stress S3 and the fourth internal stress S4 are at opposite sides (e.g., edges) of the display apparatus.

On the other hand, when a vicinity of the bending area BA of the display panel 10 is cut, two cut portions of the display panel 10 may not move away from each other but may maintain or substantially maintain their positions as-is, because the directions of the first internal stress S1 and the second internal stress S2 are toward the bending area BA, even though the direction of the first internal stress S1 in the first non-bending area NBA1 is the same as the direction of the second internal stress S2 in the second non-bending area NBA2. Accordingly, whether a display apparatus has been manufactured according to one or more of the manufacturing methods of the present disclosure or manufactured according to the comparative manufacturing method (e.g., see FIG. 7) may be confirmed, by using the above-described methods. In addition to the above-described methods, a method of detecting a value of each internal stress of each layer of a display apparatus may be used to effectively confirm whether the display apparatus is manufactured according to one or more of the manufacturing methods of the present disclosure.

Figure 11:
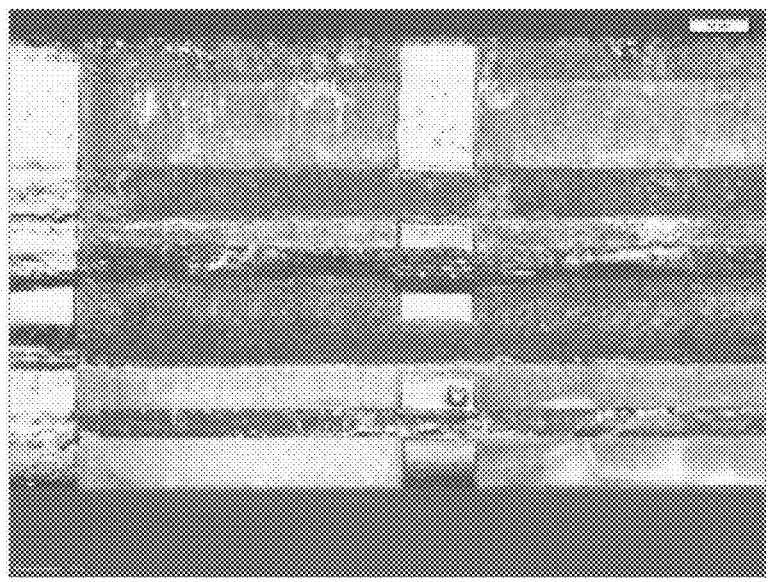
FIGS. 11 and 12 are images schematically illustrating portions of a display apparatus manufactured according to a method of manufacturing the same according to an embodiment.
Figure 12:
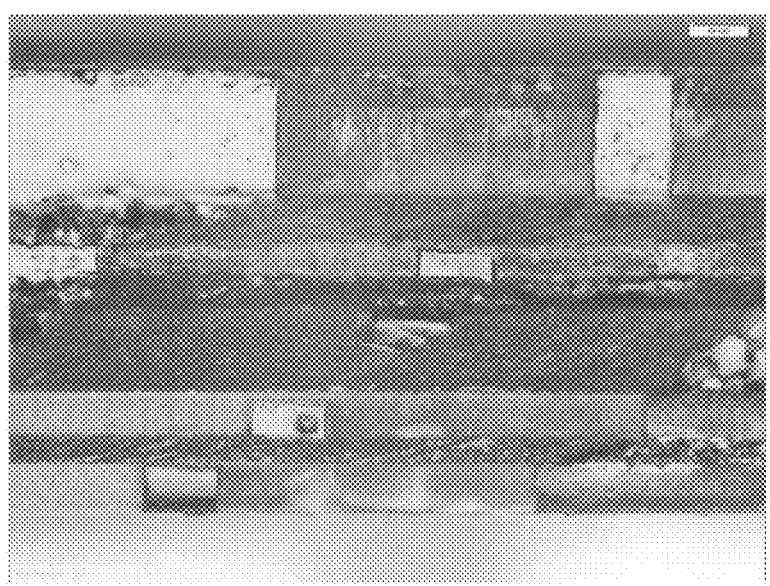

As illustrated in FIG. 11, the display apparatus that has been manufactured according to one or more methods of embodiments of the present disclosure is cut to expose a cross-section thereof. A line having a straight line shape in an up-down direction (e.g., y-axis direction) of the cross-section may be marked on the cross-section by using a method, such as a laser marking method, in a state where a force is applied to flatten the display apparatus. If the force is not applied to the display apparatus after the line is marked on the cross-section, layers of the display apparatus may move by different displacements, and the line may be changed from the straight line shape in the up-down direction to a shape obliquely slanted with respect to the up-down direction, as illustrated in FIG. 12, because the functional layer 30, which is in the non-bending state or in the bending state different from the bending state of the display panel 10, is attached to the display panel 10, and because displacement amounts of the respective layers are different according to different internal stresses of the respective layers.

However, if a functional layer in a flat state is attached to a display panel while in the flat state, when a line having a straight line shape in an up-down direction of the cross-section is marked on the cross-section by using the laser marking method, in both a state where a force is applied to flatten the display apparatus and a state where the force is not applied to the display apparatus, the line having the straight line shape is not changed but maintains or substantially maintained as-is.

In the descriptions of the display apparatus within the scope of the present description, the display panel 10, the adhesive layer 20, and the functional layer 30 are sequentially stacked in order from a bottom to a top of the display apparatus. However, the present disclosure is not limited thereto.

For example, in a display apparatus having a stack structure including a first layer, the adhesive layer 20, and a second layer, which are sequentially stacked in order from a bottom to a top of the display apparatus, if a direction of internal stress in a first portion of the first layer is different from a direction of internal stress in a second portion of the first layer, this display apparatus is within the scope of the present description. In the previously-described embodiments, it is understood that the first layer may be the display panel 10, and the second layer may be the functional layer 30. However, it may be possible that the first layer may be the functional layer 30, and the second layer may be the display panel 10. In this case, the descriptions of the display panel 10 may applied to the first layer as the functional layer, and the descriptions of the functional layer 30 may be applied to the second layer as the display layer. This is also applied to various embodiments and modifications thereof.

It should be understood that example embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein, without departing from the spirit and scope of the present invention as defined by the following claims, and their equivalents.

What is claimed is:

1. A display apparatus comprising:
   a flexible first layer comprising a bending area;
   an adhesive layer on an upper surface of the flexible first layer; and
   a second layer attached to the flexible first layer by the adhesive layer,
   wherein the flexible first layer is bendable toward a lower surface of the flexible first layer that is opposite the upper surface from a flat state to a first bent state and is further bendable toward the lower surface from the first bent state to a second bent state, and
   wherein, when the flexible first layer is in the flat state, a direction of internal stress at a first portion of the flexible first layer is opposite a direction of internal stress at a second portion of the flexible first layer and is opposite a direction of internal stress at the first portion of the flexible first layer when the flexible first layer is in the second bent state.

2. The display apparatus of claim 1, wherein the first portion and the second portion are at respective non-bending areas of the flexible first layer.

3. The display apparatus of claim 1, wherein the first portion is at one side of the bending area, and wherein the second portion is at another side of the bending area.

4. The display apparatus of claim 1, wherein, when the flexible first layer is in the flat state, a direction of internal stress at a third portion of the second layer is opposite a direction of internal stress at a fourth portion of the second layer.

5. The display apparatus of claim 4, wherein the third portion and the fourth portion correspond to respective non-bending areas of the second layer.

6. The display apparatus of claim 4, wherein the third portion is at one side of the bending area, and wherein the fourth portion is at another side of the bending area.

7. The display apparatus of claim 4, wherein the first portion is at one side of the bending area,
wherein the second portion is at another side of the bending area,
wherein the third portion corresponds to the first portion, and
wherein the fourth portion corresponds to the second portion.

8. The display apparatus of claim 7, wherein the direction of the internal stress at the first portion is opposite the direction of the internal stress at the third portion, and
wherein the direction of the internal stress at the second portion is opposite the direction of the internal stress at the fourth portion.

9. The display apparatus of claim 1, wherein the flexible first layer comprises a display panel, and
wherein the second layer comprises a functional layer.

10. The display apparatus of claim 9, wherein the functional layer comprises at least one of a touch screen panel, a polarizer, and a window.

* * * * *